United States Patent [19]

Alwell

[11] 4,067,143
[45] Jan. 10, 1978

[54] PLANT WATERING REMINDER

[76] Inventor: Patrick J. Alwell, 10 Randolph Place, Hazlet, N.J. 07730

[21] Appl. No.: 711,388

[22] Filed: Aug. 3, 1976

[51] Int. Cl.² .......................................... A01G 25/00
[52] U.S. Cl. ......................................... 47/79; 47/81
[58] Field of Search ..................................... 47/79, 81

[56] References Cited

U.S. PATENT DOCUMENTS

| 880,968 | 3/1908 | Bunker | 47/81 |
|---|---|---|---|
| 1,231,975 | 7/1917 | Weitzel | 47/79 |
| 1,231,976 | 7/1917 | Weitzel | 47/79 |
| 1,400,628 | 12/1921 | Rudolph | 47/81 |
| 1,810,236 | 6/1931 | Bender | 47/79 |
| 3,534,498 | 10/1970 | Herrli | 47/81 |

FOREIGN PATENT DOCUMENTS

| 233,181 | 3/1961 | Australia | 47/81 |
|---|---|---|---|
| 1,035,799 | 8/1953 | France | 47/79 |
| 1,005,287 | 4/1952 | France | 47/81 |
| 322,809 | 7/1918 | Germany | 47/79 |
| 2,419,703 | 4/1974 | Germany | 47/81 |
| 12,057 of | 1896 | United Kingdom | 47/81 |

Primary Examiner—E. H. Eickholt

[57] ABSTRACT

A plant watering device for use in conjunction with a plant pot having a rim, the watering device responsive to maintain a desired moisture condition within the planting medium, and having housing means adapted to be readily applicable and removable from the rim of the plant pot with retaining means extending downwardly from the housing means to peripherally encompass the rim to prevent lateral movement relative thereto so that the housing means is retained in seated position relative to the plant pot. Reservoir means extends upwardly from the housing means and in partially overlapping relationship to the planting medium in the plant pot, and fluid transferring means extends between the reservoir means and into the soil medium for a gradual transfer of fluid from within the reservoir means to the planting medium.

5 Claims, 4 Drawing Figures

U.S. Patent     Jan. 10, 1978     4,067,143
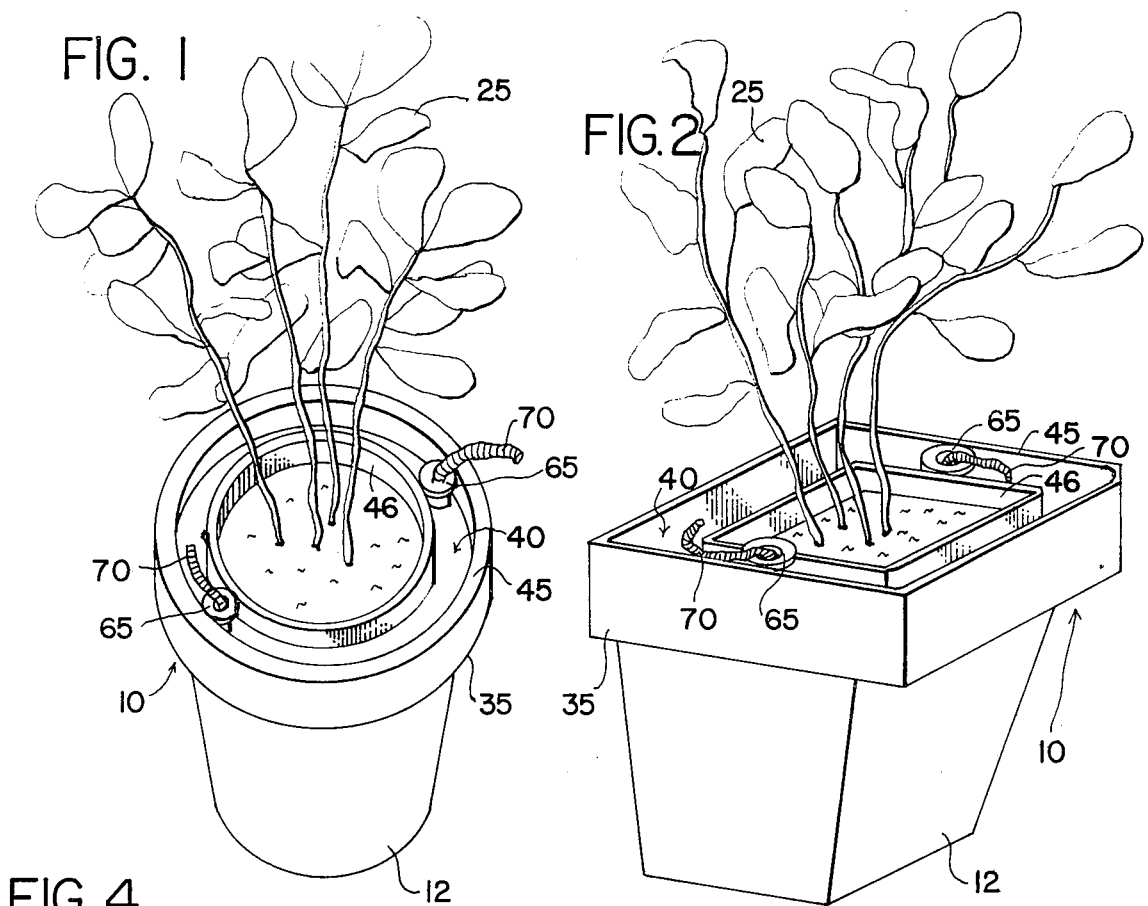
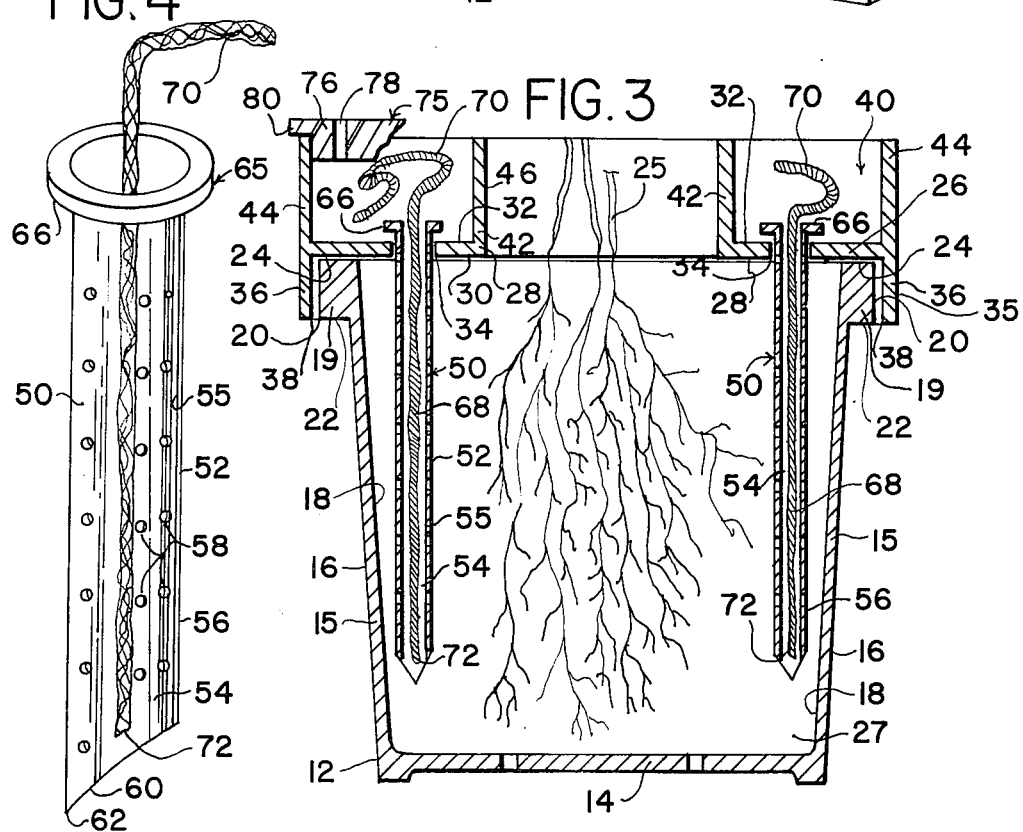

PLANT WATERING REMINDER

BACKGROUND OF THE INVENTION

The present invention relates to an attachment for a flower pot or other plant container, or the like, and more particularly to a plant watering device for the plants growing within the pot.

The present invention intends to provide a plant watering device that is easily and conveniently attached to a plant pot so as to obtain a self-watering of the pot depending upon the need of the plants therein.

OBJECTS OF THE INVENTION

An object of the present invention is to provide a plant watering device that is removably secured to a plant pot having a portion thereof positioned below the planting medium for the transferring of fluid thereto.

Another object of the present invention is to provide an automatic plant watering device which encircles and substantially hides a portion of the plant pot with a reservoir that is easily replenished.

Another object of the present invention is to provide a plant watering device that is strong and durable, simple in construction and manufacture, which can be constructed from various readily available materials which are highly attractive in appearance, and which is inexpensive to produce, thereby permitting wide distribution and utilization.

Other objects and advantages of the present invention will become apparent as the disclosure proceeds.

SUMMARY OF THE INVENTION

A plant watering device for use in conjunction with a plant pot having a rim, the watering device responsive to maintain a desired moisture condition within the planting medium, and having housing means adapted to be readily applicable and removable from the rim of the plant pot with retaining means extending downwardly from the housing means to peripherally encompass the rim to prevent lateral movement relative thereto so that the housing means is retained in seated position relative to the plant pot. Reservoir means extends upwardly from the housing means and in partially overlapping relationship to the planting medium in the plant pot, and fluid transferring means extends between the reservoir means and into the soil medium for a gradual transfer of fluid from within the reservoir means to the planting medium.

The fluid transferring means includes an opening extending through the housing means to provide access between the reservoir and the planting medium, with a fluid transferring member having an axially extending passageway therethrough adapted to extend vertically through the opening and into the planting medium. A plurality of fluid ports extend between the passageway and the exterior of the fluid transferring member, and an elongated irrigating wick having the upper end thereof positioned within the reservoir and the lower end thereof within the passageway, such that fluid is transferred in response to the moisture condition of the planting medium.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a perspective view of the plant watering device of the present invention utilized in conjunction with a pot having a circular configuration;

FIG. 2 is a perspective view of the plant watering device of the present invention utilized in conjunction with a pot having a rectangular configuration;

FIG. 3 is a sectional view through the pot illustrated in either FIG. 1 or FIG. 2, illustrating the plant watering device in accordance with the present invention; and FIG. 4 is a perspective view illustrating the fluid transferring means in accordance with the present invention.

DETAILED DESCRIPTION OF THE DRAWINGS

Referring to FIGS. 1-4 of the drawings, there is illustrated a plant watering device 10 for use in conjunction with a plant pot 12 that may have a circular configuration as illustrated in FIG. 1 or a rectangular configuration as illustrated in FIG. 2. The various interrelated components of the invention are the same for either shaped pot 12.

The pot 12 may be of a plastic or ceramic material and generally includes a bottom wall 14 with an upwardly extending side wall 15 having an outer surface 16 and an inner surface 18 that is generally outwardly tapered. The upper end of the side wall 15 merges with a rim having a circumferentially extending outer edge 20 that has a lower flange 22 and an upper flange 24 that defines the open end of the pot 12. Within the pot 12 may be planted one or more plants 25 that may vary, and which are retained in place by a planting medium 27 which may be soil or a variety of other composits.

The plant watering device 10 includes housing means 26 adapted to be readily applicable and removable from the rim 19 of the plant pot 12. The housing means 26 includes a housing wall 28 that may extend in a substantially horizontal plane having a lower surface 30 for engagement with the upper flange 24 and an upper surface 32. One or more openings 34 may extend vertically through the housing means 26 between the surfaces 30 and 32.

In order to retain the plant watering device 10 confined to the position illustrated in FIG. 3, retaining means 35 is downwardly extending from the housing means 26 to peripherally encompass the rim 19. This prevents lateral movement so that the housing means 26 is retained in seated position relative to the plant pot 12. The retaining means 35 includes a peripheral wall 36 having an inner edge 38 extending in vertically spaced relation to the outer edge 20 of flange 19. The peripheral wall 36 may be integrally formed with the housing wall 28.

To retain the fluid that is to be absorbed by the planting medium 27, reservoir means 40 is provided and extends upwardly from the housing means 26 and in partially overlapping relationship to the planting medium 27. The reservoir means 40 includes a pair of vertically extending peripherally spaced apart inner wall 42 and outer wall 44. The respective walls 42 and 44 may be integrally formed with the housing wall 28. The respective portions of the housing means 26, retaining means 35, and reservoir means 40 may be moulded out of plastic or fabricated in some other way. For the form of the invention illustrated in FIG. 2, the inner wall 42 and outer wall 44 may have a rectangular configuration. With respect to the form of the invention illustrated in FIG. 1, the spaced apart walls 42 and 44 may define circular configuration. The upper end 45 forms the top of each of the respective walls 42 and 44.

The plant 25 extends vertically upward through an aperture 46 defined by the inner surface of the walls 42 and the apeture 46 is substantially centrally disposed on the plant pot 12. Fluid transferring means 50 is utilized and extends between the reservoir means 40 which is filled with water or some other fluid. Fluid transferring means 50 extends vertically into the soil medium 27 for a gradual transfer of fluid from within the reservoir 40 to the planting medium 27. The transferring means 50 which extends through the openings 34, two being shown, includes a fluid transferring member 52 having an axially extending passageway 54 for the flow of water therethrough. The transferring member 52 includes an inner wall 55 defining the passageway 54 and an outer wall 56. A plurality of fluid ports 58 extend between the passageway 54 and the exterior wall surface 56 of the fluid transferring member 52. To facilitate entrance of the tubular member 52, the forward end has a tapered portion 60 terminating in a point 62 to facilitate entry thereof into the planting medium 27.

To limit the travel of the fluid transferring means 50, stop means 65 is provided at the upper end thereof and may include a radially extending flange 66 having a greater diameter than the opening 34 such that downward movement through the opening 34 is prevented. An elongated irrigating wick 68 is disposed in each fluid passageway 54 having the upper end 70 thereof positioned within the reservoir 40 and the lower end 72 thereof extending almost to the tip 62 of the fluid transferring member 52. In this manner fluid is transferred along the wick 68 in response to the moisture condition of the planting medium 27.

To prevent evaporation of the fluid within the reservoir means 40, cover means 75 is provided to overlap the upper end 45 and may include a cover member 76 having one or more venting holes 78 with an outwardly extending shoulder 80 which abuts the upper end 45.

It is appreciated that various fertilizer and other chemicals may be introduced into the fluid and that the self-watering device 10 may take various forms and shapes to fit various flower pots. The system is completely free of moving parts, and the actual wicks may be changed from time to time.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. A plant watering device for use in conjunction with a plant pot having a rim, the watering device responsive to maintain a desired moisture condition within the planting medium, and comprising,
   a. housing means adapted to be readily applicable and removable from the rim of the plant pot,
   b. retaining means extending downwardly from said housing means to peripherally encompass the rim to prevent lateral movement relative thereto so that said housing means is retained in seated position relative to the plant pot,
   c. reservoir means extending upwardly from said housing means and in partially overlapping relationship to the planting medium in the plant pot,
   d. said reservoir means includes a pair of vertically extending peripherally spaced apart walls for receiving the fluid therebetween,
   e. an aperture formed by the inner of said walls substantially centrally disposed on said housing means for the plant to extend therethrough,
   f. fluid transferring means extending between said reservoir means and into the soil medium for a gradual transfer of fluid from within the reservoir means to the planting medium, said fluid transferring means including:
      1. an opening extending through said housing means to provide access between said reservoir and the planting medium,
      2. a fluid transferring member having a rigid wall with an axially extending passageway therethrough, said fluid transferring member adapted to removably extend vertically through said opening and into the planting medium,
      3. a plurality of fluid ports extending between said passageway and the exterior of said fluid transferring member,
      4. an elongated irrigating wick having the upper end thereof positioned within said reservoir and the lower end thereof within said passageway, such that fluid is transferred in response to the moisture condition of the planting medium, and
      5. said forward end of said fluid transferring member is tapered to facilitate entry thereof into the planting medium, and
   g. stop means at the upper end of said fluid transferring member to prevent said fluid transferring member from passing through said opening and also being removable from said housing.

2. A plant watering device as in claim 1, wherein said walls define a rectangular configuration.

3. A plant watering device as in claim 1, wherein said walls define a circular configuration.

4. A plant watering device as in claim 1, wherein a spaced apart pair of said fluid transferring means are provided.

5. A plant watering device as in claim 1, and further including cover means removably secured to said walls to limit the moisture evaporation of the fluid from within said reservoir.

* * * * *